US008761360B1

(12) United States Patent
Gongaware et al.

(10) Patent No.: US 8,761,360 B1
(45) Date of Patent: Jun. 24, 2014

(54) INDIVIDUAL LOCATION TRACKING IN DETENTION ENVIRONMENTS

(71) Applicant: Telmate, LLC, San Francisco, CA (US)

(72) Inventors: Grant Gongaware, San Francisco, CA (US); Nick Garcia, Oakland, CA (US); Richard Torgersrud, San Francisco, CA (US); Kevin Krauss, San Francisco, CA (US)

(73) Assignee: Telmate, LLC, San Francisco, CA (US)

( * ) Notice: Subject to any disclaimer, the term of this patent is extended or adjusted under 35 U.S.C. 154(b) by 0 days.

(21) Appl. No.: 13/843,563

(22) Filed: Mar. 15, 2013

(51) Int. Cl.
*H04M 11/00* (2006.01)
*H04M 3/38* (2006.01)

(52) U.S. Cl.
CPC .................................. *H04M 3/382* (2013.01)
USPC .................................. 379/93.02; 379/142.05

(58) Field of Classification Search
USPC .......................................... 379/93.02, 142.05
See application file for complete search history.

(56) References Cited

U.S. PATENT DOCUMENTS

| 8,458,732 | B2 * | 6/2013 | Hanna et al. | 719/328 |
|---|---|---|---|---|
| 2012/0281058 | A1 * | 11/2012 | Laney et al. | 348/14.03 |

* cited by examiner

*Primary Examiner* — Quynh Nguyen
(74) *Attorney, Agent, or Firm* — McDermott Will & Emery LLP

(57) ABSTRACT

Methods for permitting a log in to a restricted access communications terminal are provided. In one aspect, a method includes receiving a request from a user to access a communications terminal, the request including a first authentication provided by the user, and verifying the first authentication provided by the user. The method also includes identifying the user based on the verified first authentication, determining, based on an actual location of the communications terminal, that the user is restricted from accessing the communications terminal, and requesting a second authentication from the user when the user is attempting to access the communications terminal from an unauthorized or undocumented location. The method further includes receiving the second authentication from the user, verifying the second authentication provided by the user, and providing access to the user to the communications terminal based on the verified second authentication. Systems, terminals, and machine-readable media are also provided.

22 Claims, 7 Drawing Sheets

INDIVIDUAL LOCATION TRACKING IN DETENTION ENVIRONMENTS

BACKGROUND

1. Field

The present disclosure generally relates to computer systems, and more particularly to the use of a computer system to monitor a location of an individual.

2. Description of the Related Art

Many detention environments attempt to keep an updated record of a location of individuals (or "residents") at the facility in order to provide appropriate limited access to the individual to items or spaces in the facility. In order to maintain the record, the detention environment (or "controlled facility"), which may be a correctional facility (e.g., detention center, jail, or prison), military installation, or even secure office location, commonly requires facility staff to manually update the location of individuals in the facility in a legacy system. For example, in a correction facility, a jail management system is manually updated with recent user (e.g., a resident or inmate) location data, such as an identification of the cell or "home room" to which the resident is assigned.

In many cases, because the updates of an individual's location are input manually by facility staff, the location of the individual recorded in the legacy system is often in disagreement with the actual location of the individual. The incorrect information can last from a period of a few minutes to many days or weeks. The out-of-date information can cause denial of access to items or physical spaces the individual would otherwise have access to if the legacy system were updated with the individual's current location.

For example, in a correction facility, there are often a limited number of communication terminals (e.g., telephones, video visitation stations, etc.) by which a large number of residents may communicate with visitors, family, and friends. As residents usually do not have access to terminals outside the physical space in which they reside, a resident must commonly reserve a terminal or book use of the terminal (e.g., by walking up to and laying claim to the terminal) at a time for a scheduled visit so as to ensure the availability of the terminal to the resident. Furthermore, to allow incoming telephone calls to be routed to a terminal that the resident to whom the call is intended has access to, particularly those telephone calls that are not pre-scheduled, it is necessary to know which location the resident is currently in. Residents who are unable to make or receive telephone calls or video visitations after being moved to a new location are likely to file formal complaints stating that they are unable to contact friends, family, or legal representation for some period after being moved. These complaints tie up the valuable time of facility staff, for example, to arrange an update for a resident's location identified in the jail management system, and these complaints cause both the facility and communications provider to incur costs, such as legal costs or other related costs.

SUMMARY

According to one embodiment of the present disclosure, a computer-implemented method for permitting a user to log into a restricted access communications terminal is provided. The method includes receiving a request from a user to log into a communications terminal, the request including a first authentication provided by the user, and verifying the first authentication provided by the user. The method also includes identifying the user based on the verified first authentication, and determining, based on an actual location of the communications terminal, that the identified user is restricted from logging into the communications terminal. The method further includes requesting a second authentication from the user when the user is attempting to access the communications terminal from an unauthorized or undocumented location, and receiving the second authentication from the user. The method yet further includes verifying the second authentication provided by the user, and permitting the user to log into the communications terminal based on the verified second authentication. The user is permitted to log into the communications terminal based on the verified first authentication if the user is in an authorized location.

According to another embodiment of the present disclosure, a system for permitting a user to log into a restricted access communications terminal is provided. The system includes a memory that includes instructions, and a processor. The processor is configured to execute the instructions to receive a request from a user to log into a communications terminal, the request including a first authentication provided by the user, verify the first authentication provided by the user, and identify the user based on the verified first authentication. The processor is also configured to execute the instructions to determine, based on an actual location of the communications terminal, that the user is restricted from logging into the communications terminal, request a second authentication from the user when the user is attempting to access the communications terminal from an unauthorized or undocumented location, and receive the second authentication from the user. The processor is further configured to execute the instructions to verify the second authentication provided by the user, and permit the user to log into the communications terminal based on the verified second authentication. The user is permitted to log into the communications terminal based on the verified first authentication if the user is in an authorized location.

According to a further embodiment of the present disclosure, a communications terminal is provided. The terminal includes a first input device configured to receive a personal identification number from a user, a second input device configured to receive a biometric authentication from the user, a memory that includes instructions, and a processor. The processor is configured to execute the instructions to receive a request from a user to log into the communications terminal, the request including the personal identification number provided by the user, verify the personal identification number provided by the user, and identify the user based on the verified personal identification number. The processor is also configured to execute the instructions to determine, based on an actual location of the communications terminal, that the user is restricted from logging into the communications terminal, request the biometric authentication from the user when the user is attempting to access the communications terminal from an unauthorized or undocumented location, and receive the biometric authentication from the user. The processor is further configured to execute the instructions to verify the biometric authentication provided by the user, and permit the user to log into the communications terminal based on the verified personal identification number and the verified biometric authentication. The user is permitted to log into the communications terminal based on the verified first authentication if the user is in an authorized location.

According to yet a further embodiment of the present disclosure, a machine-readable storage medium includes machine-readable instructions for causing a processor to execute a method for permitting a user to log into a restricted access communications terminal is provided. The method includes receiving a request from a user to log into a communications terminal, the request including a first authentication provided by the user, verifying the first authentication provided by the user, and identifying the user based on the verified first authentication. The method also includes determining, based on an actual location of the communications terminal, that the user is restricted from logging into the communications terminal, requesting a second authentication from the user when the user is attempting to access the communications terminal from an unauthorized or undocumented location, and receiving the second authentication from the user. The method further includes verifying the second authentication provided by the user, and permitting the user to log into the communications terminal based on the verified second authentication. The user is permitted to log into the communications terminal based on the verified first authentication if the user is in an authorized location.

It is understood that other configurations of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
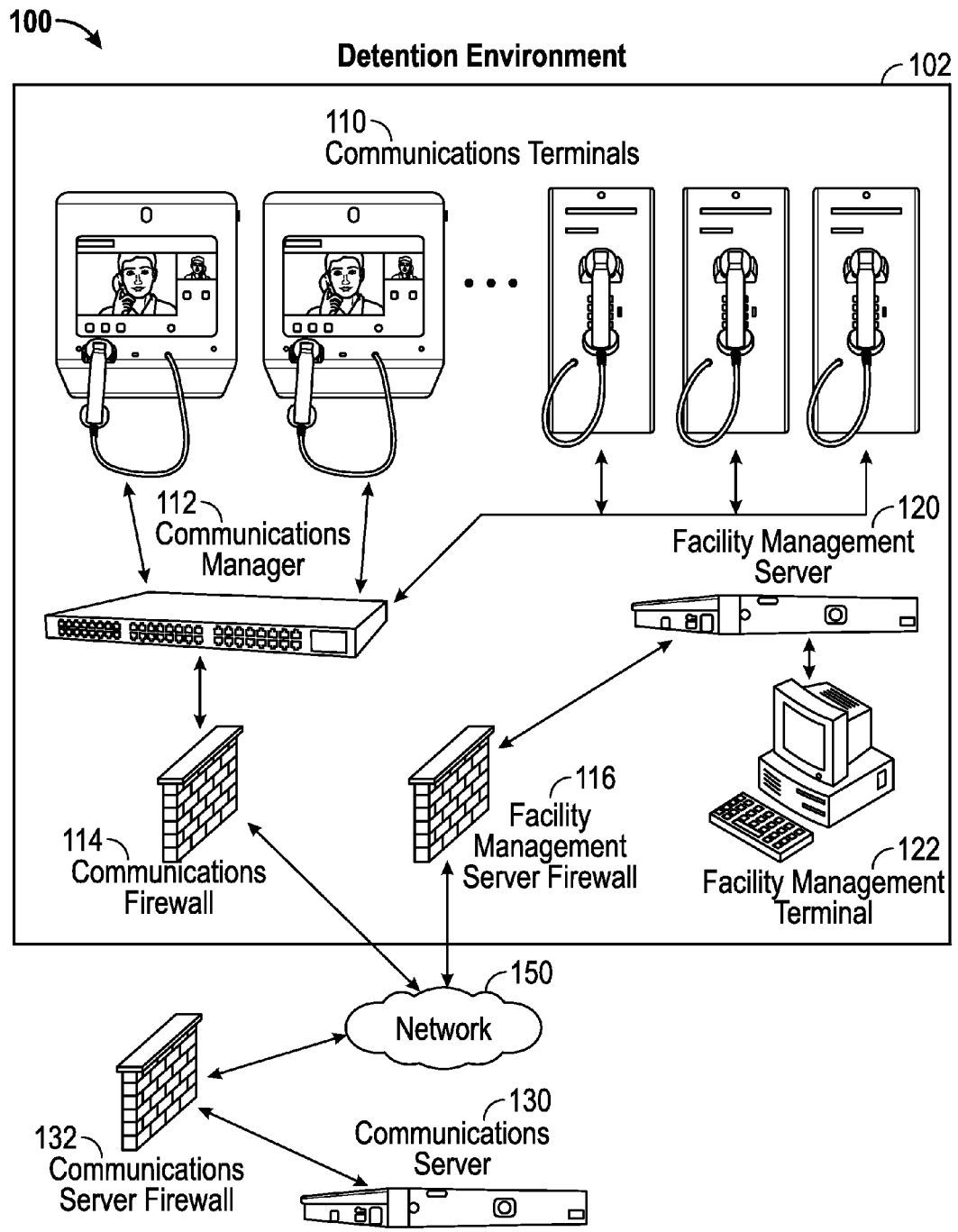
FIG. 1 illustrates an example architecture for providing access to a restricted access communications terminal.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

It is desirable to devise a system in which a current location of an individual ("user" or "resident") within a facility can be determined automatically, thus ensuring proper access rights are provided to physical spaces, and items, such as phones, allowing a greater degree of accuracy to be applied to that resident's biometric identification. In certain aspects, the term "resident" is understood to refer to an individual subject to a detention environment (e.g., residing or secured in, or on parole, work release or probation from jails, prisons, detention facilities, secured hospitals or addiction treatment facilities). If a resident can be determined to be in a location, then that resident's biometric information (such as voiceprint, fingerprint, facial recognition) may be compared to those known to be in the same physical space, rather than all individuals in a facility. This allows greater accuracy when using biometric identification, which in turn provides greater protection against fraudulent activity, such as falsely logging into a phone as a different individual and using that resident's calling funds. It is also desirable to obtain date and time information for the resident's location in the detention environment so that movement of the resident can be chronologically identified. It is further desirable to have a system that automatically updates a resident's location within the detention environment that interfaces with and independently verifies a manually updated resident's location provided by an official record of resident status.

This disclosed system updates a location of a resident in a detention environment based on usage of a communications terminal by the resident. As a result, incorrect or delayed updates from an official record of resident status are disregarded or corrected. For example, the disclosed system may use two forms of authentication. An initial authentication, such as a personal identification number (PIN), is provided first for a resident by a user (e.g., the resident presumably being the user). If the initial authentication is received at a communications terminal that the resident identified by the initial authentication is not associated with, then a secondary authentication that can be input by only the correct user can be required because the initial authentication can be input by any user. The secondary authentication can be a biometric identification such as a voiceprint or facial scan that identifies the resident's identity and location of the communications terminal that is otherwise not previously associated with the resident. The association between the communications terminal and the resident can then be updated based on the successful authorization at the communications terminal so that the resident can subsequently log into the communications terminal using just the initial authentication.

While many examples are provided herein in the context of a correction facility, the principles of the present disclosure contemplate other types of controlled facilities as well. For example, businesses and governmental entities (e.g., administrative or military) are all considered within the scope of the present disclosure. Furthermore, although many examples provided herein describe a resident's location information being stored in memory, permission is granted for each resident to have such resident location information stored. In the context of a detention environment, permission may be granted by the resident agreeing to be present in the detention environment, or by another entity with appropriate legal authorization to grant permission to track the location of the resident in the detention environment. Each resident can be provided notice that such resident information will be stored. The stored resident information may be encrypted to protect resident security.

FIG. 1 illustrates an example architecture 100 for permitting a resident to log into a restricted access communications terminal. The architecture 100 illustrates a detention environment 102 that includes communications terminals 110 connected to a network 150 through a communications firewall 114 using a communications manager 112. The detention environment 102 also includes a facility management server 120 (e.g., a system of record for storing the facility's official record of resident status, such as a Jail Management System) accessed by a facility management terminal 122 and connected to the network 150 through a facility management server firewall 116. The architecture 100 further includes a communications server 130 as described herein connected to the network 150 through a communications server firewall 132. The firewalls 114, 116, and 132 can be software-based or hardware-based.

Each of the communications terminals 110 is connected to a communications manager 112. In certain aspects, for purposes of load balancing, the communications terminals 110 can be connected to many communications managers. The communications terminals 110 can be audio communication terminals, video communication terminals, tactile communications terminals (e.g., for the visual and/or hearing impaired), or other terminals configured for communication between two individuals. In certain aspects, the communication terminals can be mobile, such as mobile smartphones or mobile kiosks. The communications manager 112 to which the communications terminals 110 are connected can be, for example, a networking device such as a router, gateway, or switch. The communications manager 112 can be configured for various protocols of communication including, for example, Internet Protocol (IP), voice over IP (VoIP), audio and video Internet telephony network protocols, or telephone switching.

The communications manager 112 is connected to the network 150, such as the Internet, a metropolitan area network (MAN), a wide area network (WAN), a broadband network (BBN), and the like. Further, the network 150 can include, but is not limited to, any one or more of the following network topologies, including a bus network, a star network, a ring network, a mesh network, a star-bus network, tree or hierarchical network, and the like. In certain aspects where the communications server 130 is located at the detention environment 102, the network 150 can include, for example, any one or more of a personal area network (PAN), a local area network (LAN), or a campus area network (CAN). The connection between the communications manager 112 and the network 150 can be protected using a communications firewall 114, which can be particularly relevant to protecting the security of the detention environment 102 by limiting log ins to devices in the detention environment 102 to authorized residents or processes.

The facility management server 120 is a system of record for storing the facility's official record of resident status. The facility management server 120 is also configured to receive user entered (e.g., manual) information regarding the access rights of a resident in the detention environment 102 to log into one or many of the communications terminals 110. The facility management server 120 is accessible from the facility management terminal 122, which can be, for example, a desktop computer, mobile computer, tablet computer, mobile device, or any other device having appropriate processor, memory, and communications capabilities. The user entered information can include an identifier of an assigned location for a resident in the detention environment 102. The access rights can be location-based or resident-based. For example, permission to log into a communications terminal 110 can be defined according to constructs, such as groups.

Groups may be used to subdivide portions of the detention environment 102 and to differentiate locations and residents in the detention environment 102 so as to provide group-specific permissions for communications terminals 110 associated with those groups. For example, a location is designated as a "shared location" if access to the shared location (and any communications terminal 110 in the shared location) is provided to multiple, but not all, residents in the detention environment 102. Permission to log into a communications terminal 110 in the shared location can, for instance, be authorized for a group of residents in a first location of the detention environment 102 (e.g., a first jail unit) and residents in a second location of the detention environment 102 (e.g., a second jail unit), but not for a group of residents in another location of the detention environment 102 (e.g., a third jail unit). A location is designated as a "common location" if access to the common location (and any communications terminal 110 in the common location) is provided to all residents in the detention environment 102. A communications terminal 110 may be located in (e.g., assigned to) a shared, unshared, common, or other type of location.

The facility management server 120 may assign residents or groups of residents to a specific unshared location (or "home room") in addition to shared and common locations. Residents are then permitted to log into communications terminals 110 located in their home room, in shared rooms associated with the home room, and in common rooms accessible to the entire facility, or alternately, shared rooms accessible to a subset of the facility associated with the group of which that the collection of rooms is a member.

The communications server 130 is connected to the network 150 through the communications server firewall 132. The communications server 130 is responsible for hosting resident location information provided by the communications terminals 110 for residents in the detention environment 102. The communications server 130 can be any device having an appropriate processor, memory, and communications capability for hosting the terminal-based resident location information.

In certain aspects, the communications server 130 receives an update from a communications terminal 110 regarding a location of a resident upon the resident successfully accessing the communications terminal 110. A user may successfully log in to a communications terminal 110 as a resident by providing at least a first form of authentication, such as a PIN, to identify the resident. The PIN may be preceded by the user identifying which resident the user is (e.g., by name) in the detention environment. If the identified resident does not currently have permission to log into the communications terminal 110, such as where the resident is part of a group that is not associated with the communications terminal 110, then the user is prompted for a second form of identification, for instance, a biometric identification such as a voiceprint. In certain aspects, the user may initially be prompted for the second form identification thereby bypassing the first form of authentication. If the second form of identification is verified, the user is permitted to log into the communications terminal 110 as the resident and the terminal-based user location information stored on the communications server 130 is updated to reflect an updated location for the resident so that the resident has permission to log into the communications terminal 110.

The communications server 130 is also configured to obtain resident assigned location information from the facility management server 120. The resident assigned location information 228 can be obtained, for example, during regularly scheduled requests from the communications server 130 to the facility management server 120. If the resident assigned location information is identified as being more current than the terminal-based resident location information of the communications server 130 (e.g., if the resident assigned location information has a more recent timestamp or is for a new location not previously identified in the terminal-based resident location information), then the terminal-based resident location information is updated with the resident assigned location information from the facility management server 120. In certain aspects, if the terminal-based resident location information is determined to be more accurate than the resident assigned location information, then the communications server 130 can update the resident assigned location information on the facility management server 120. The update can be provided, for example, using an application programming interface for the facility management server 120.

The ability to automatically detect and verify that a resident in a detention environment has moved, even when the resident assigned location information of the facility management server 120 has not yet been updated, allows the resident to, for example, use communications terminals 110 or receive deliveries immediately after moving to the new location. Additionally, a visualization of the resident's movement over time can be provided. Automatic detection and verification avoids tasking facility staff or telecommunications provider staff with manually updating the resident assigned location information and avoids having the resident be unable to communicate using the communications terminal 110. Furthermore, the communications server 130 is configured to provide current location information (e.g., in a report) for any resident in response to a request, such as might be needed during an emergency evacuation.

Furthermore, in addition to tracking the location of residents in the detention environment 102, the communications terminals 110 can be used to track the location of staff (e.g., security guards or officers in a correction facility) as a way to verify completion of assigned rounds, and to cross-reference staff and resident locations in order to track and record occurrences of staff being present in locations that are germane to relevant inquiries or reports. For example, in a correction facility, tracking of staff can be referenced when a staff member picks up an inmate phone and enters the staff member's own PIN.

Although the disclosed architecture 100 permits an automated process of granting residents permission to log into communications terminals, it will be obvious to one skilled in the art that the communications terminal 110 and the communications server 130, by nature of the recording of actual resident location each time the resident logs into a communications terminal 110, can be used to generate a list, map, or other report detailing each resident's likely current location and history of movement throughout the detention environment 102.

Figure 2:
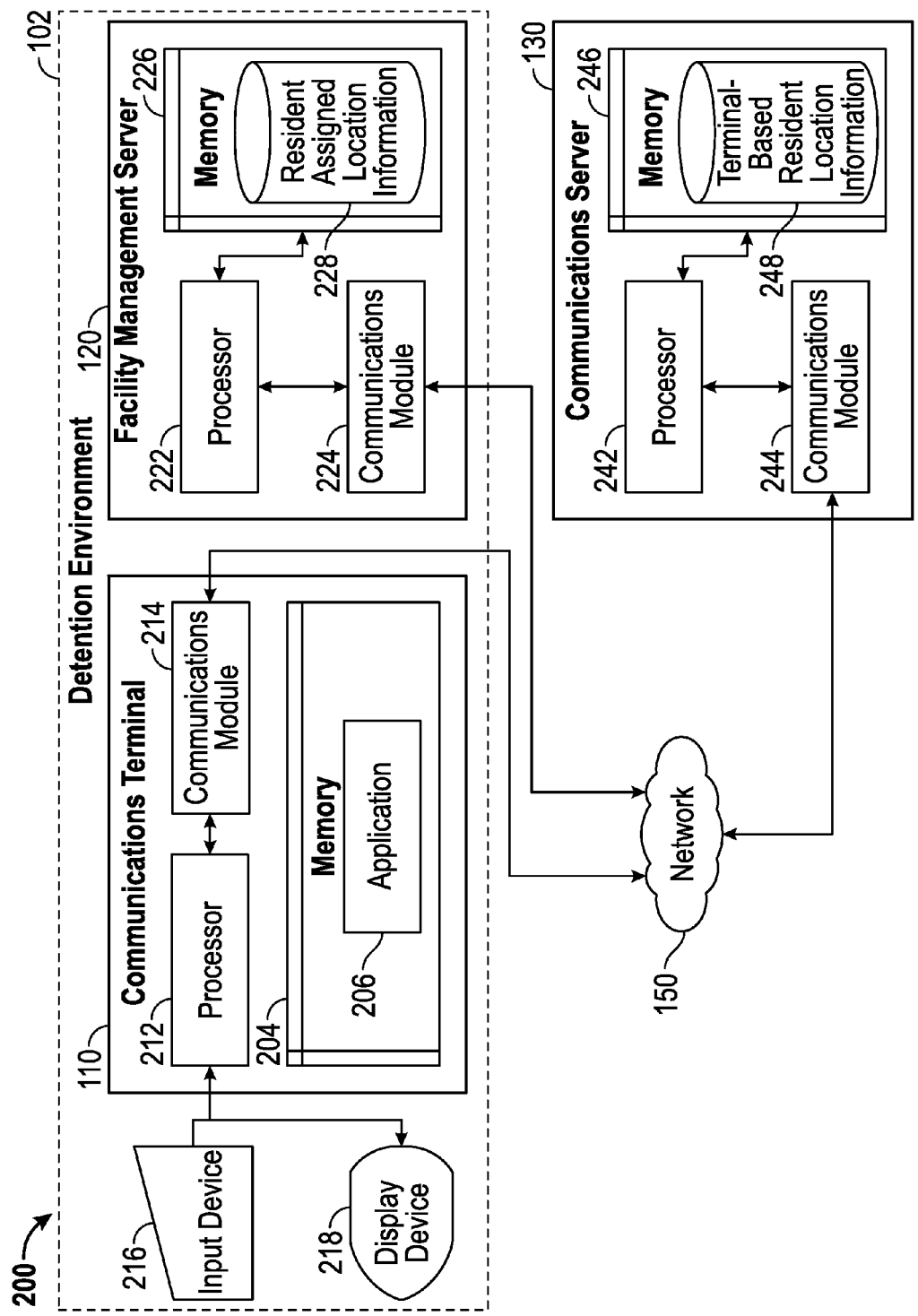
FIG. 2 is a block diagram illustrating the example communications terminal and servers from the architecture of FIG. 1 according to certain aspects of the disclosure.

FIG. 2 is a block diagram 200 illustrating an example communications terminal 110, facility management server 120, and communications server 130 in the architecture 100 of FIG. 1 according to certain aspects of the disclosure. The communications terminal 110, facility management server 120, and communications server 130 are connected over the network 150 via respective communications modules 214, 224, and 244. The communications modules 214, 224, and 244 are configured to interface with the network 150 to send and receive information, such as data, requests, responses, and commands to other devices on the network 150. The communications modules 214, 224, and 244 can be, for example, modems or Ethernet cards.

The communications terminal 110, which can be a telephone, videophone, or camera, includes a processor 212 (or connected downstream to a processor, e.g., at communications server 130), the communications module 214, and a memory 204 that includes an application 206. Although the communications terminal 110 is illustrated as including the processor 212 for example only, it is understood that in certain aspects where, for example, the communications terminal 110 is a telephone, the processor 212 is not included in the communications terminal. The application is configured to control log ins to the communications terminal 110. The communications terminal 110 also includes an input device 216 and an output device 214, such as a display. The input device 216 can include, for example, a keyboard, a touchpad, a microphone, a camera, touchscreen, or mouse.

The processor 212 of the communications terminal 110 is configured to execute instructions, such as instructions physically coded into the processor 212, instructions received from software (e.g., application 206) in memory 240, or a combination of both, to restrict logging in based on the location of the communications terminal 110 within a detention environment 102. For example, the processor 212 of the communications terminal 110 executes instructions from the application 206 to receive (e.g., by input device 216) a request from a user to log into the communications terminal 110. The request includes a first authentication for a resident provided by the user. The first authentication can be, for example, a PIN, a text or image password, a username and password combination, a visual shape or pattern, or a touch motion. The processor 212 is configured to verify the first authentication provided by the user and identify the user based on the verified first authentication. For example, using respective communications modules 214 and 244, the processor 212 can send a request to the communications server 130 that includes the first authentication provided by the user. The processor 242 of the communications server 130 can compare the received first authentication against terminal-based resident location information 248 in the memory 246 of the communications server 130 to determine whether the first authentication is valid, and whether the resident associated with the first authentication has permission to log in to use the communications terminal 110. For example, a determination that the identified resident is restricted from logging into the communications terminal 110 can be based on comparing a stored location of the resident (e.g., from resident assigned location information 228 on the facility management server 120) with the location of the communications terminal 110, and determining that the stored location of the resident is different than the location of the communications terminal 110. The terminal-based resident location information 248 can be initially generated using the resident assigned location information 228, and can be updated when a resident first successfully logs into a communications terminal 110 from a different location than the location for the resident indicated in the resident assigned location information 228.

The processor 212 is further configured to determine, based on the location of the communications terminal 110, whether the identified resident is restricted from logging into the communications terminal 110. For instance, the communications terminal 110 may be located in an area to which the resident (or the resident's group) does not have permission to log in from. A determination (based on information provided in the response from the communications server 130) that the resident is restricted from logging into the communications terminal 110 can include determining that the stored location (e.g., in the resident assigned location information 228 of the facility management server 120) of the resident restricts the resident from logging in to terminals in the actual location of the communications terminal 110.

When it is determined that the resident identified by the user's first authentication is restricted (e.g., by the facility management server 120) from logging into the communications terminal 110, the processor 212 is configured to provide, for display, a prompt requesting a second authentication from the user. The prompt can be visible or audible. The second authentication can be one or a combination of physiological biometric identifications or behavioral biometric identifications. Example physiological biometric identifications include the resident's voice, DNA, finger print, palm print, retinal scan, facial scan, iris scan, vein matching. Example behavioral biometric identifications include the resident's handwriting sample, typing rhythm, gait, or voice.

Upon receiving the second authentication from the user (e.g., using input device 216), the processor 212 of the communications terminal 110 verifies the second authentication provided by the user. Similar to verification of the first authentication, the processor 212 can send a request to the communications server 130 that includes the second authentication provided by the user. The processor 242 of the communications server 130 can compare the received second authentication against the terminal-based resident location information 248 to determine whether the second authentication is valid. If a determination (e.g., based on information provided in the response from the communications server 130) is made that the second authentication is valid, thereby indicating that a biometrically matching resident is at the communications terminal 110, then the processor 212 is configured to permit the user to log into the communications terminal 110 (e.g., as the resident) based on the verified second authentication.

In certain aspects, the processor 212 of the communications terminal 110 or the processor 242 of the communications server 130 is configured to update the resident-assigned location information 228 of the facility management server 120 based on the location of the communications terminal 110 when the second authentication provided by the user is verified. For example, the resident-assigned location information 228 can be updated with the current location of the resident (e.g., based on the location of the communications terminal 110) using an application programming interface configured to update the resident assigned location information 228. In certain aspects, updating the stored location of the resident based on the location of the communications terminal can include storing an identification of a time at which the request from the resident to log into the communications terminal 110 is received. For example, the resident-assigned location information 228 can be updated to include a time and day at which the resident successfully logged into the communications terminal 110 in addition to updating the resident-assigned location information 228 with the location of the user.

In certain aspects, the processor 212 of the communications terminal 110 or the processor 242 of the communications server 130 is configured to update the stored location of the resident (e.g., in the terminal-based user location information 248) with location information received from a resident database (e.g., from resident assigned location information 228) of the facility management server 120. The stored location can be updated when the information from the resident database indicates that the actual location of the resident is different than the stored location of the resident or the location of the communications terminal, or that a user is otherwise attempting to log into the communications terminal as the resident in an unauthorized manner. For example, if the resident-assigned location information 228 indicates that a resident is located in Residential Unit C, and the terminal-based resident location information indicates the resident is currently located in Residential Unit 2 and further indicates the resident has not successfully placed a call from a communications terminal 110 in Unit C (or otherwise been located in Unit C), then the terminal-based resident location information can be updated to reflect the resident's location in Residential Unit C and provide appropriate log in permission to the resident to communication terminals 110 in Residential Unit C.

Although the disclosed block diagram 200 illustrates the terminal-based resident location information 248 as being stored in the memory 246 of the communications server 130, the terminal-based user location information 248 can be stored in the memory 204 of the communications terminal 110, or the communications server 130 can be located in the detention environment 102. For example, the terminal-based user location information 248 can be provided by the communications server 130 to one or many communications terminals 110, for example, as a form of data replication.

Figure 3A:
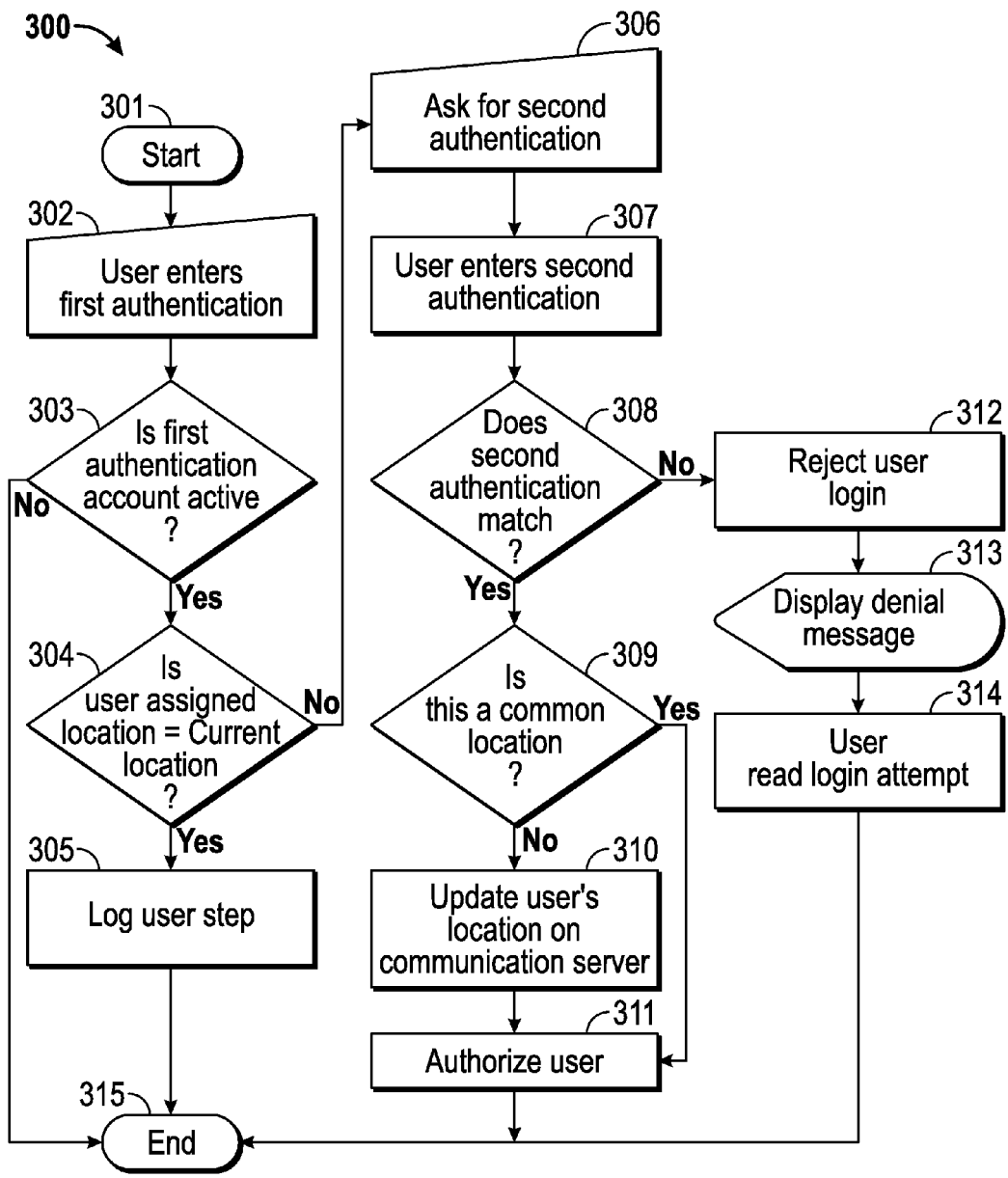
FIG. 3A illustrates an example process for providing access to a restricted access communications terminal using the example communications terminal and servers of FIG. 2.
Figure 3B:
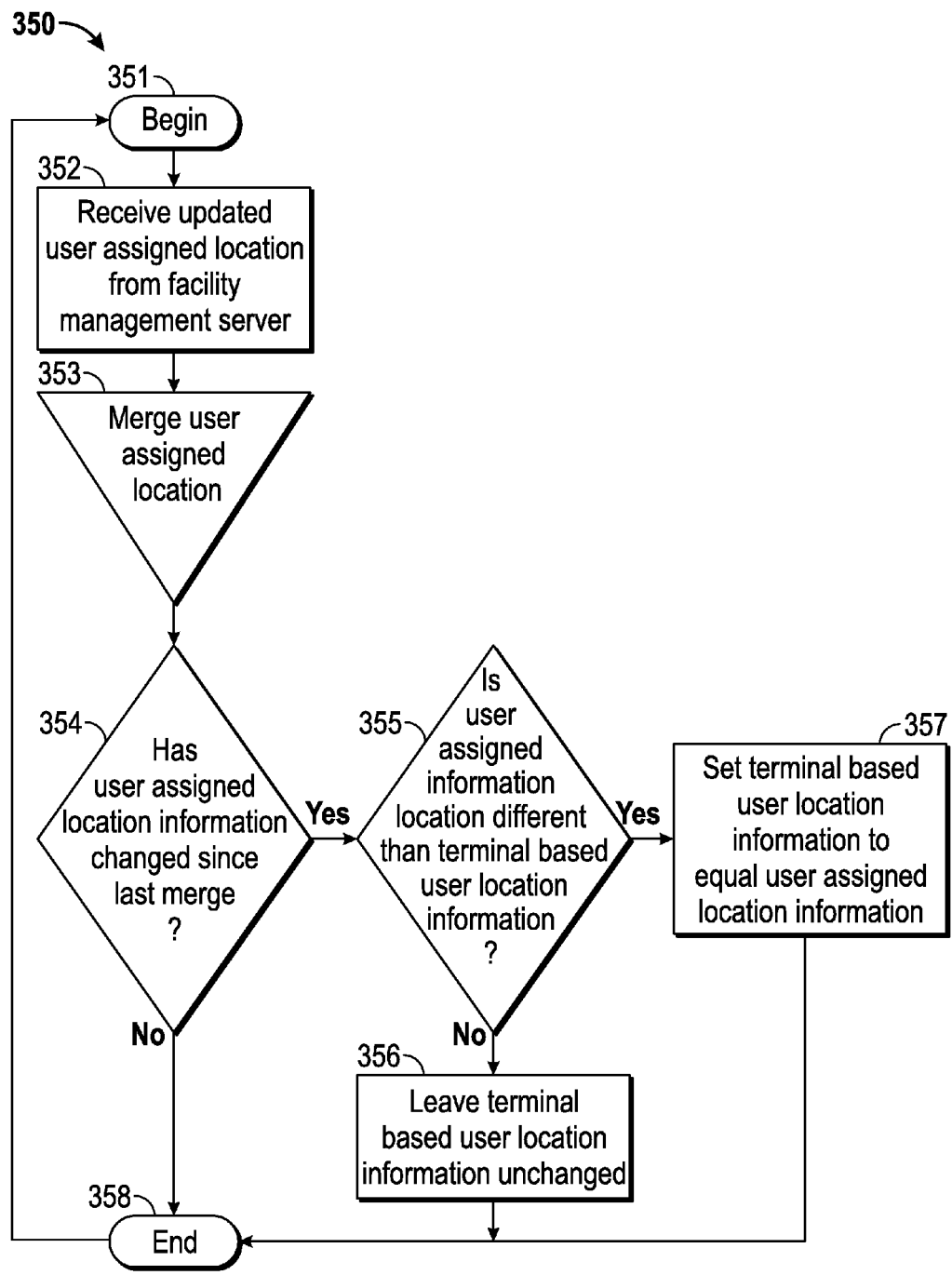
FIG. 3B illustrates an example process for synchronizing location information for a user using the example servers of FIG. 2.

FIG. 3A illustrates an example process 300 for permitting a resident to log into a restricted access communications terminal using the example communications terminal 110, facility management server 120, and communications server 130 of FIG. 2, and FIG. 3B illustrates an example process for synchronizing location information for a user using the example servers of FIG. 2. While FIG. 3A is described with reference to FIG. 2, it should be noted that the process steps of FIG. 3A may be performed by other systems. The process 300 begins by proceeding from start step 301 when a user requests to use a communications terminal 110 to step 302 when the user enters a first authentication (e.g., to identify the resident).

In decision step 303, a determination is made whether the first authentication is active (e.g., valid). If the determination of step 303 indicates the first authentication is not active, the process 300 ends in step 315. If the determination of step 303 indicates the first authentication is active, the process 300 proceeds to decision step 304 in which a determination is made whether the resident's assigned location, as already present in the communications server database and based on the synchronization process described above, is the same as the current location (e.g., of the communications terminal 110). If the determination of step 304 indicates that the resident's assigned location is the same as the current location, then the user is logged in to the communications terminal 110 (e.g., as the resident) in step 305 and the process ends in step 315.

If the determination of step 304 indicates that the user's assigned location is not the same as the current location, then the user is prompted for a second authentication in step 306, and the user may then in step 307 provide second authentication. Next, in decision step 308, a determination is made whether the second authentication matches a valid authentication for the identified resident (e.g., a matching fingerprint or voiceprint).

If the determination of step 308 indicates the second authentication is a match, the process 300 proceeds to decision step 309 in which a determination is made whether the current location is a common location. Optionally, if the determination of step 308 indicates the second authentication is not a match (e.g., does not provide a sample or provides an incorrect sample), an appropriate authority may be informed of the attempted use and follow up with the resident identified by the first authentication. If the determination of step 309 indicates that the current location is a common location, the user is authorized using the second authentication in step 311, and the process 300 ends in step 315. If the determination of step 309 indicates that the current location is not a common location, the terminal-based user location information 248 for the resident on the communications server 130 is updated with the current location of the user, and the process 300 proceeds to step 311 where the user is authorized. The process 300 then ends in step 315. Depending on the desires of the facility management, the new terminal-base user location may be reported to the facility staff, which may then update their resident assigned location or investigate whether the inmate is in an unauthorized or undocumented area.

If the determination of step 308 indicates the second authentication is not a match, the process 300 proceeds to step 312 in which the user login is rejected and a denial message is displayed on the communications terminal 110 in step 313. Next, the user login attempt is recorded in step 314, and the process 300 ends in step 315.

FIG. 3A sets forth an example process 300 for permitting a resident to log into a restricted access communications terminal using the example communications terminal 110, facility management server 120 that is a jail management system, and communications server 130 of FIG. 2. An example will now be described using the example process 300 of FIG. 3A and a detention environment 102 that is a correction facility as provided in the example illustrations of FIGS. 4A and 4B.

Figure 4A:
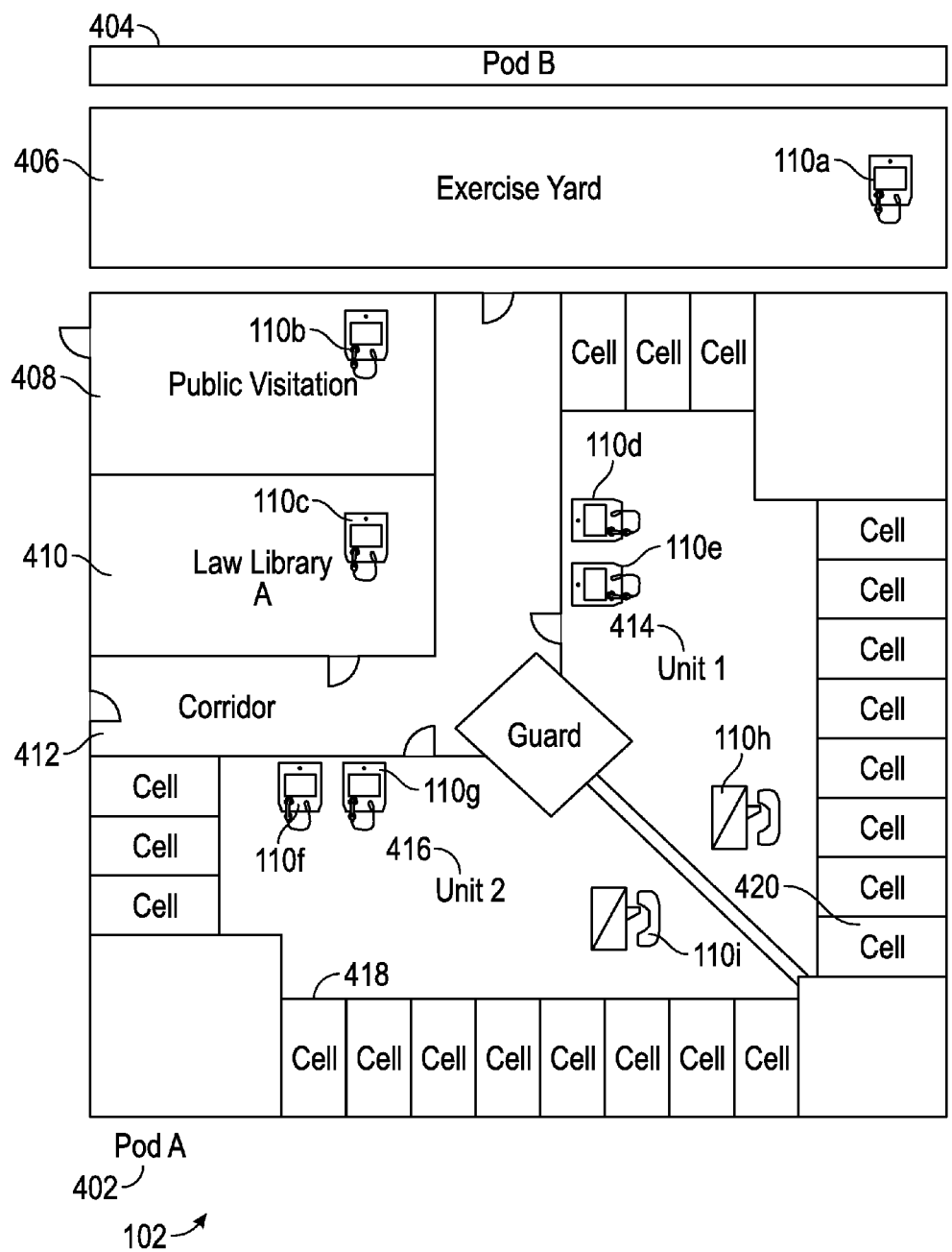
FIGS. 4A and 4B is an example illustrations of a layout of a detention environment and location access rights associated with the example process of FIG. 3.

The correction facility 102 illustrated in FIG. 4A includes two popular cell block buildings (or "pods"), Pod A 402 and Pod B 404. Pod A 402 is illustrated in detail. Pod A 402 includes a first unit, Unit 1 414, which includes a number of cells 420 for housing residents of the correction facility 102. Unit 1 414 also includes three communications terminals 110, namely, two videophones 110d and 110e and one telephone 110h. Pod A 402 also includes a second unit, Unit 2 416, similar to Unit 1 414, which also includes a number of cells 418 for housing residents of the correction facility 102. Unit 2 416 also includes three communications terminals 110, namely, two videophones 110f and 110g and one telephone 110i. Pod A 402 also includes one shared location, namely, a law library 410. The law library 410 also includes one communications terminal 110, videophone 110c.

Pod A 402 further includes a public visitation room 408 that includes one communications terminal 110, videophone 110b. Access to the public visitation room 408 is restricted to outside visitors for the purpose of conducting on-site video visitations using videophone 110b, and thus none of the residents are permitted to log into the videophone 110b. The detention environment 102 also includes a common location outside of Pod A 402, namely, an exercise yard 406 between Pod A 402 and Pod B 404 with one communications terminal 110, videophone 110a.

Figure 4B:
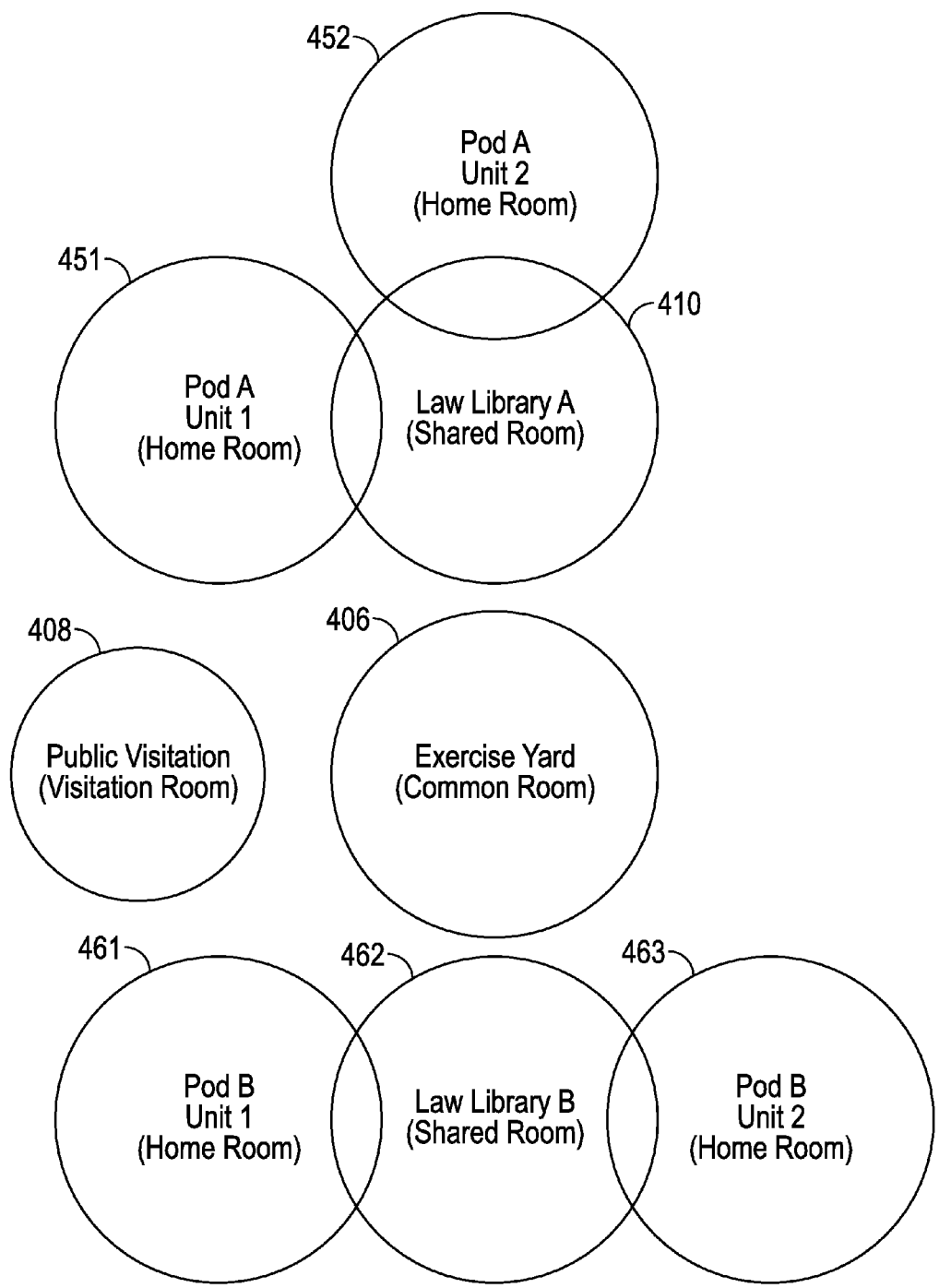

With reference to FIG. 4B, residents 451 of Pod A Unit 1 are allowed to use Law Library A 410 and exercise yard 406, but may not enter Unit 2 416. Likewise, residents in Unit 2 416 of Pod A 402 are allowed to use Law Library A 410 and exercise yard 406, but may not enter Unit 1 414. Similarly, residents of either unit in Pod B 404 may use the exercise yard 406, but may not enter Pod A 402. Residents 452 of Unit 2 in Pod A are allowed to use the Law Library A 410 and exercise yard 406, but may not enter Unit 2 416. Likewise, residents 452 in Unit 2 of Pod A 402 are allowed to use Law Library A 410 and Exercise Yard, but may not enter Unit 1 414. Similarly, inmates of Unit 1 461 and Unit 2 463 in Pod B may use the Exercise Yard 406 and their own Law Library B 462, but may not enter Pod 1's Law Library A 410 or any of its Units 414 and 416. The exercise yard 406 is defined as a common location (or "common room"), to which all inmates at the facility have access. Likewise, Law Library A 410 is defined as a shared location (or "shared room"), which only some inmates at the facility have access to, namely, those residing in Unit 1 414 and Unit 2 416. The Public Visitation room 408 can be defined as a visitation room, which is restricted to outside visitors for the purpose of conducting on-site video visitations, and thus none of the inmates are allowed access to or to use telecommunications terminals therein. Telephone and/or video visitation terminals may be located in any or all of these types of rooms.

With reference to the example process 300 of FIG. 3A, the process 300 begins by proceeding from start step 301 when a resident currently residing in Unit 2 416 attempts to use the videophone 110f as a user. The resident was recently transferred from Unit 1 414 to Unit 2 416, but the resident assigned location information 228 in the jail management system 120 was not updated with the resident's location in Unit 2 416.

Upon arriving in Unit 2 416, the resident in step 302 attempts to log into the videophone 110f by entering the resident's unique PIN to identify the resident to the videophone 110f. Using previously existing systems, the resident would not be able to successfully log in to the videophone 110f because the videophone 110f would rely on outdated information from the resident assigned location information 228.

In decision step 303, the videophone 110f asks the communications server 130 if the PIN is valid (e.g., with reference to the terminal-based resident location information 248). The determination of step 303 indicates the PIN is valid according to the communications server 130, and the process 300 proceeds to decision step 304 in which the videophone 110 asks the communications server 130 whether the resident's assigned location (e.g., with reference to the terminal-based resident location information) is the same as the current location (e.g., Unit 2 416, in which the videophone 110f is located). The determination of step 304 indicates that the resident's assigned location of Unit 1 414 (as reported by the resident assigned location information of the jail management system 120) is not the same as the resident's current location, Unit 2 416, so the resident is prompted for a biometric identification in step 306, namely, a voiceprint sample of the resident's name.

Biometric identification of the resident is advantageous in that it is more accurate in identifying the resident than a PIN because biometric identification requires a physical presence and is therefore much more difficult to impersonate. Requirement of a physical presence as a form of identification makes it more difficult to steal, trade, copy, or fabricate the biometric identification. The authentication provided by biometric identification protects against a resident using another resident's PIN to get around restrictions based on available funds for the videophone 110f or prohibited contacts.

Next, in decision step 308, the videophone 110f asks the communications server 130 if the voiceprint of the resident's name provided by the resident to the videophone 110f is valid for the identified resident (e.g., with reference to the terminal-based resident location information 248). The determination of step 308 indicates the voiceprint is valid according to the communications server 130, and the process 300 proceeds to decision step 309 in which a determination is made whether the current location, Unit 2 416, is a common location (e.g., like the exercise yard 406). The determination of step 309 indicates that Unit 2 416 is not a common location, so the terminal-based resident location information 248 on the communications server 130 is updated with the current location, Unit 2 416, of the resident, along with the time and date of the resident's use of the videophone 110f. The process 300 proceeds to step 311 where the resident is authorized to use the videophone 110f, and the process 300 then ends in step 315.

FIG. 3B illustrates an example process 350 for synchronizing location information for a resident using the example servers 120 and 130 of FIG. 2. While FIG. 3B is described with reference to FIG. 2, it should be noted that the process steps of FIG. 3B may be performed by other systems. The process 350 begins by proceeding from beginning step 351 to step 352 when updated resident assigned location information 228 is received (e.g., by the communications server 130) from the facility management server 120. Next, in step 353, the resident assigned location information 228 is merged with the terminal-based resident location information 248. In decision step 354, a determination is made whether the resident assigned location for a resident (e.g., in the resident assigned location information 228) has changed since a previous merging of the resident assigned location information 228 with the terminal-based resident location information 248. If the determination in decision step 354 indicates the resident's location in the resident assigned location information 228 has not changed since the previous merge, the process 350 ends in step 358. If, however, the determination in decision step 354 indicates the resident's location in the resident assigned location information 228 has changed since the previous merge, the process 350 proceeds to decision step 355.

In decision step 355, a determination is made whether the resident-assigned location for the resident (as indicated by the received resident assigned location information 228 in step 352) indicates that the resident's location is different in the resident assigned location information 228 than in the terminal-based resident location information 248, and whether the resident assigned location information 228 for the resident is more recent (e.g., by timestamp) than the terminal-based resident location information 248 for the resident. If the determination of decision step 355 indicates the locations do not differ, then the process 350 proceeds to step 356 in which the terminal-based resident location information 248 for the resident is preserved and the process 350 then ends in step 358.

If the determination of decision step 355 indicates both that the locations do differ and that the resident assigned location information 228 for the resident is different than both the terminal-based resident location information 248 and the previously reported resident assigned location information 228 for the resident, then the process 350 proceeds to step 357 in which the terminal-based resident location information 248 for the resident is updated with the more recent and likely more accurate information on the resident from the resident assigned location information 228. The process 350 then ends in step 368.

FIG. 3B set forth an example process 350 for synchronizing location information for a resident using the example servers 120 and 130 of FIG. 2. An example will now be described using the example process 350 of FIG. 3B, a facility management server 120 that is a jail management system, the correction facility as provided in the example illustration 400 of FIG. 4A, and a resident that is a resident moved from Unit 2 416 to Unit 1 414.

The process 350 begins by proceeding from beginning step 351 each time the communications server 130 queries the jail management system 120 to step 352 when updated resident assigned location information 228 is received from the jail management system 120. Next, in step 353, the resident assigned location information 228 is merged with the terminal-based resident location information 248. In decision step 354, a determination is made whether the resident assigned location for each resident (e.g., in the resident assigned location information 228) has changed since a previous merging of the resident assigned location information 228 with the terminal-based resident location information 248.

The determination in decision step 354 indicates a resident's location in the resident assigned location information 228, Unit 1 414, has changed since the previous merge, where the resident was identified as being located in Unit 2 416, so the process 350 proceeds to decision step 355 in which a determination is made whether the resident-assigned location of Unit 1 414 for the resident (as indicated by the received resident assigned location information 228 in step 352) has changed since the last merge (step 353) and is different from both the resident assigned location from the previous merge (step 353) and from the current terminal-based resident location 228 information for the resident. If so, the process 350 proceeds to step 357 in which the terminal-based resident location information 248 for the resident is updated with the more recent information on the resident from the resident assigned location information 228 indicating the resident is in Unit 1 414. The process 350 then ends in step 368.

Figure 5:
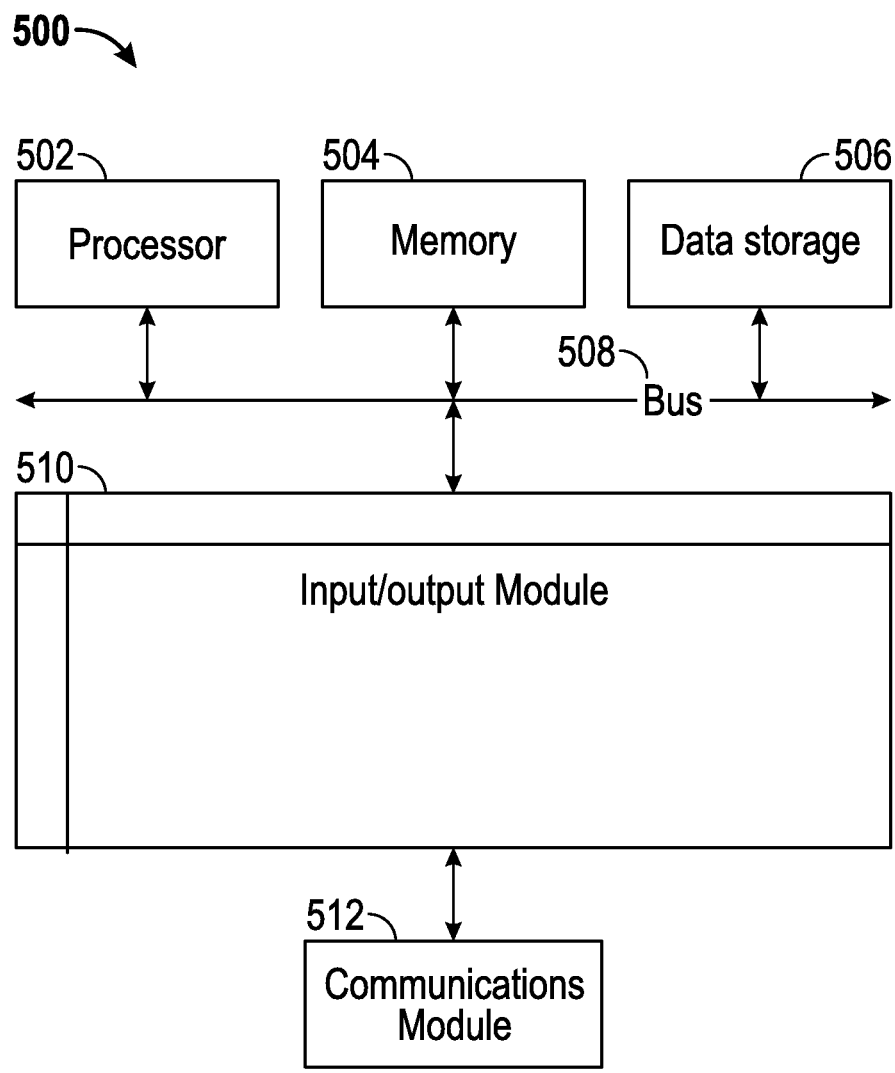
FIG. 5 is a block diagram illustrating an example computer system with which the example communications terminal and servers of FIG. 2 can be implemented.

FIG. 5 is a block diagram illustrating an example computer system 500 with which the communications terminal 110, facility management server 120, and communications server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., communications terminal 110, facility management server 120, and communications server 130) includes a bus 508 or other communication mechanism for communicating information, and a processor 502 (e.g., processor 212, 222, and 242) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 204, 226, and 246), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourthgeneration languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 214, 224, and 244) include networking interface cards, such as Ethernet cards and modems. In certain aspects, the input/output module 510 is configured to connect to a plurality of devices, such as an input device (e.g., input device 216) and/or an output device (e.g., display device 218). Example input devices include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices include display devices, such as a LED (light emitting diode), CRT (cathode ray tube), or LCD (liquid crystal display) screen, for displaying information to the user.

According to one aspect of the present disclosure, the communications terminal 110, facility management server 120, and communications server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a PAN, LAN, CAN, MAN, WAN, BBN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description, including the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. Other variations are within the scope of the following claims.

These and other implementations are within the scope of the following claims.

What is claimed is:

1. A computer-implemented method for permitting a user to log into a restricted access communications terminal, the method comprising:

receiving a request from a user to log into a communications terminal, the request comprising a first authentication provided by the user;

verifying the first authentication provided by the user;

identifying the user based on the verified first authentication;

determining, based on an actual location of the communications terminal, that the identified user is restricted from logging into the communications terminal;

requesting a biometric authentication from the user when the user is attempting to access the communications terminal from an unauthorized or undocumented location;

receiving the biometric authentication from the user;

verifying the biometric authentication provided by the user; and permitting the user to log into the communications terminal based on the verified biometric authentication, wherein the user is permitted to log into the communications terminal based on the verified first authentication if the user is in an authorized location.

2. The method of claim 1, wherein determining that the user is restricted from logging into the communications terminal comprises comparing a stored location of the user with the actual location of the communications terminal, and determining that the stored location of the user is different than the actual location of the communications terminal.

3. The method of claim 2, further comprising updating the stored location of the user based on the actual location of the communications terminal when the biometric authentication provided by the user is verified.

4. The method of claim 3, wherein updating the stored location of the user based on the actual location of the communications terminal comprises storing an identification of a time at which the request from the user to log into the communications terminal is received.

5. The method of claim 3, further comprising updating the stored location of the user with actual location information received from a user database when the information from the user database indicates that the actual location of the user is different than the stored location of the user or the actual location of the communications terminal.

6. The method of claim 1, wherein determining that the user is restricted from logging into the communications terminal comprises determining that a stored location of the user restricts the user from logging into terminals in the actual location of the communications terminal.

7. The method of claim 1, wherein the communications terminal comprises at least one of a telephone, videophone, camera, touchscreen, keyboard, or biometric scanner.

8. The method of claim 1, wherein the first authentication comprises a personal identification number.

9. The method of claim 1, wherein the communications terminal is configured to restrict the user from logging in based on the actual location of the communications terminal within a detention environment.

10. The method of claim 1, wherein the biometric identification comprises at least one of the user's voice, DNA, finger print, retinal scan, facial scan, iris scan, or vein matching.

11. A system for permitting a user to log into a restricted access communications terminal, the system comprising:

a memory comprising instructions; and a processor configured to execute the instructions to:

receive a request from a user to log into a communications terminal, the request comprising a first authentication provided by the user;

verify the first authentication provided by the user;
identify the user based on the verified first authentication;
determine, based on an actual location of the communications terminal, that the user is restricted from logging into the communications terminal;
request a biometric authentication from the user when the user is attempting to access the communications terminal from an unauthorized or undocumented location;
receive the biometric authentication from the user;
verify the biometric authentication provided by the user; and
permit the user to log into the communications terminal based on the verified biometric authentication,
wherein the user is permitted to log into the communications terminal based on the verified first authentication if the user is in an authorized location.

12. The system of claim 11, wherein the processor being configured to determine that the user is restricted from logging into the communications terminal comprises the processor being configured to compare a stored location of the user with the actual location of the communications terminal and determine that the stored location of the user is different than the actual location of the communications terminal.

13. The system of claim 12, wherein the processor is further configured to update the stored location of the user based on the actual location of the communications terminal when the biometric authentication provided by the user is verified.

14. The system of claim 13, wherein the processor being configured to update the stored location of the user based on the actual location of the communications terminal comprises the processor being configured to store an identification of a time at which the request from the user to log into the communications terminal is received.

15. The system of claim 14, wherein the processor is further configured to update the stored location of the user with actual location information received from a user database when the information from the user database indicates that the actual location of the user is different than the stored location of the user or the actual location of the communications terminal.

16. The system of claim 11, wherein the processor being configured to determine that the user is restricted from logging into the communications terminal comprises the processor being configured to determine that a stored location of the user restricts the user from logging into terminals in the actual location of the communications terminal.

17. The system of claim 11, wherein the communications terminal comprises at least one of a telephone, videophone, camera, touchscreen, keyboard, or biometric scanner.

18. The system of claim 11, wherein the first authentication comprises a personal identification number.

19. The system of claim 11, wherein the communications terminal is configured to restrict the user from logging in based on the actual location of the communications terminal within a detention environment.

20. The system of claim 11, wherein the biometric identification comprises at least one of the user's voice, DNA, finger print, retinal scan, facial scan, iris scan, or vein matching.

21. A communications terminal comprising:
a first input device configured to receive a personal identification number from a user;
a second input device configured to receive a biometric authentication from the user;
a memory comprising instructions; and
a processor configured to execute the instructions to:
receive a request from a user to log into the communications terminal, the request comprising the personal identification number provided by the user;
verify the personal identification number provided by the user;
identify the user based on the verified personal identification number;
determine, based on an actual location of the communications terminal, that the user is restricted from logging into the communications terminal;
request the biometric authentication from the user when the user is attempting to access the communications terminal from an unauthorized or undocumented location;
receive the biometric authentication from the user;
verify the biometric authentication provided by the user; and
permit the user to log into the communications terminal based on the verified personal identification number and the verified biometric authentication,
wherein the user is permitted to log into the communications terminal based on the verified first authentication if the user is in an authorized location.

22. A non-transitory machine-readable storage medium comprising machine-readable instructions for causing a processor to execute a method for permitting a user to log into a restricted access communications terminal, the method comprising:
receiving a request from a user to log into a communications terminal, the request comprising a first authentication provided by the user;
verifying the first authentication provided by the user;
identifying the user based on the verified first authentication;
determining, based on an actual location of the communications terminal, that the user is restricted from logging into the communications terminal;
requesting a biometric authentication from the user when the user is attempting to access the communications terminal from an unauthorized or undocumented location;
receiving the biometric authentication from the user;
verifying the biometric authentication provided by the user; and
permitting the user to log into the communications terminal based on the verified biometric authentication,
wherein the user is permitted to log into the communications terminal based on the verified first authentication if the user is in an authorized location.

* * * * *